US009565218B2

(12) United States Patent
Gangadharan et al.

(10) Patent No.: US 9,565,218 B2
(45) Date of Patent: Feb. 7, 2017

(54) RESOURCE MANAGEMENT FOR WEBRTC

(71) Applicant: Oracle International Corporation, Redwood Shores, CA (US)

(72) Inventors: Binod Pankajakshy Gangadharan, Bangalore (IN); Terje Strand, San Francisco, CA (US); Andreas E. Jansson, San Francisco, CA (US); Sharath Rajasekar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 141 days.

(21) Appl. No.: 14/603,980

(22) Filed: Jan. 23, 2015

(65) Prior Publication Data

US 2016/0219083 A1    Jul. 28, 2016

(51) Int. Cl.
*H04L 29/06* (2006.01)
*H04L 29/08* (2006.01)

(52) U.S. Cl.
CPC ......... *H04L 65/1069* (2013.01); *H04L 65/608* (2013.01); *H04L 67/145* (2013.01); *H04L 67/26* (2013.01)

(58) Field of Classification Search
CPC .... H04L 65/1069; H04L 67/26; H04L 67/145; H04L 65/608
See application file for complete search history.

(56) References Cited

U.S. PATENT DOCUMENTS

| | | | |
|---|---|---|---|
| 2014/0092418 A1* | 4/2014 | Kishimoto | H04N 1/00896 358/1.14 |
| 2014/0173319 A1* | 6/2014 | Zeng | G06F 11/3013 713/340 |
| 2014/0222893 A1 | 8/2014 | Gangadharan et al. | |
| 2014/0222894 A1 | 8/2014 | Gangadharan et al. | |
| 2014/0222930 A1 | 8/2014 | Gangadharan et al. | |
| 2014/0222957 A1 | 8/2014 | Gangadharan et al. | |
| 2014/0222963 A1 | 8/2014 | Gangadharan et al. | |
| 2014/0280635 A1* | 9/2014 | Bengochea | H04L 51/22 709/206 |
| 2014/0366040 A1* | 12/2014 | Parker | G06F 9/542 719/318 |

* cited by examiner

*Primary Examiner* — Ajay Cattungal
(74) *Attorney, Agent, or Firm* — Miles & Stockbridge P.C.

(57) ABSTRACT

A system performs client wake up for real-time communications ("RTC"). The system closes a connection between a gateway and an RTC application of a device. The RTC application enters a sleeping mode when the connection to the gateway is closed. After closing the connection, the system receives a message intended for the RTC application. The system requests a push notification server to wake up the RTC application, reconnects the gateway with the RTC application, and delivers the message to the RTC application.

18 Claims, 4 Drawing Sheets

RESOURCE MANAGEMENT FOR WEBRTC

FIELD

One embodiment is directed generally to a communications network, and in particular, to resource management in a communications network.

BACKGROUND INFORMATION

Voice communications are increasingly shifting to web and Internet based applications that are outside of traditional telephony networks. Enterprise users desire to access their unified communications applications with their own Internet connected mobile devices, and consumers increasingly prefer Internet based communications channels for accessing contact centers.

Some communications service providers ("CSPs") and enterprises have deployed real-time communications ("RTC") applications based on a technology known as "WebRTC." WebRTC is an open Internet standard for embedding real-time multimedia communications capabilities (e.g., voice calling, video chat, peer to peer ("P2P") file sharing, etc.) into a web browser. For any device with a supported web browser, WebRTC can use application programming interfaces ("APIs") to equip the device with RTC capabilities without requiring users to download plug-ins. By using WebRTC, CSPs may create new web based communications services and extend existing services to web based clients.

Currently, in order to be able to receive incoming calls, a WebRTC application of a user equipment ("UE") maintains a continuous ongoing communications session. This may result in resource utilization issues for the UE and/or the network. For example, on the UE side, a continuous communications session utilizes resources such as battery and data of the UE, and on the server side, a continuous communications session utilizes resources such as network ports of the server to which the UE is connected.

SUMMARY

One embodiment is a system that performs client wake up for real-time communications ("RTC"). The system closes a connection between a gateway and an RTC application of a device. The RTC application enters a sleeping mode when the connection to the gateway is closed. After closing the connection, the system receives a message intended for the RTC application. The system requests a push notification server to wake up the RTC application, reconnects the gateway with the RTC application, and delivers the message to the RTC application.

DETAILED DESCRIPTION

Embodiments provide client wake up functionality for Real-Time Communications ("RTC") of a WebRTC browser application. In one embodiment, a WebRTC application "sleeps" by closing a WebSocket connection with a gateway. After the connection is closed, if the gateway receives an incoming message (e.g., a signaling message to initiate a voice call) meant for the WebRTC application, it requests that a push notification server wakes up the WebRTC application. The gateway delivers the message to the WebRTC application upon the WebRTC application waking up and reconnecting the WebSocket connection. When the connection is re-established, all the messages are synchronized between the gateway and the WebRTC application so that the voice call is carried out "as if" the application has not been sleeping. Accordingly, embodiments allow the WebRTC application to sleep and save resources while at the same time being able to receive messages.

Figure 1:
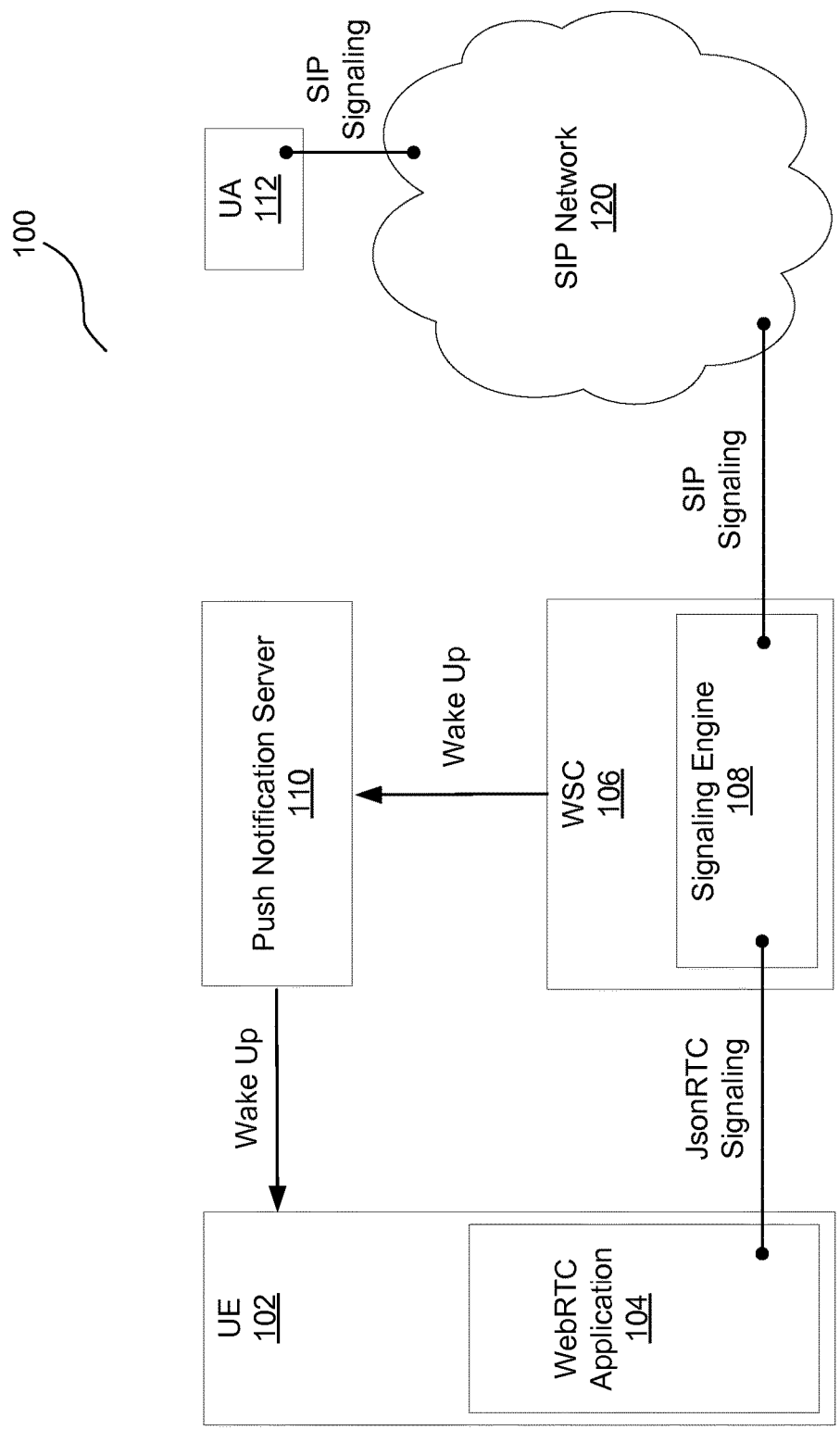
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 102 that executes a WebRTC application 104 in a web browser. WebRTC technology enables RTC in a browser as defined in the Internet Engineering Task Force ("IETF") and World Wide Web Consortium ("W3C") standards. RTC refers to a mode of communications in which users exchange information instantly or with negligible latency. UE 102 may be any device used by an end user for communications, such as a smartphone, a laptop computer, a tablet, etc.

In one embodiment, WebRTC application 104 performs RTC with an endpoint connected to a Session Initiation Protocol ("SIP") network 120. SIP is a peer to peer signaling communications protocol conventionally used for controlling multimedia communications sessions (such as voice and video calls) over Internet Protocol ("IP") networks. SIP can be used to establish, maintain, and terminate sessions between two or more peers/endpoints. Each peer in a session is referred to as a user agent ("UA") 112. UA 112 may be a client application that initiates a SIP request. Alternatively, UA 112 may be a server application that contacts a user upon receipt of a corresponding SIP request and returns a response on behalf of the user.

Network 100 further includes a WebRTC session controller ("WSC") 106 that is a gateway for connecting a web application with a communications network. A gateway translates a protocol to another protocol. In FIG. 1, WSC 106 connects WebRTC application 104 to SIP network 120. WSC 106 provides interoperability for web-to-web and web-to-network RTC. WSC 106 includes a signaling engine 108 that bridges WebRTC signaling to SIP signaling. That is, in order to initiate RTC between WebRTC application 104 and an entity connected to SIP network 120, WebRTC application 104 establishes a signaling channel with WSC signaling engine 108 over a JavaScript Object Notation ("JSON") protocol for RTC ("JsonRTC"). JSON is a lightweight data-interchange format. JsonRTC establishes the sessions and subsessions used to pass messages between WSC and its client applications. Then, another signaling channel based on SIP is established between signaling engine 108 and SIP network 120.

Figure 2:
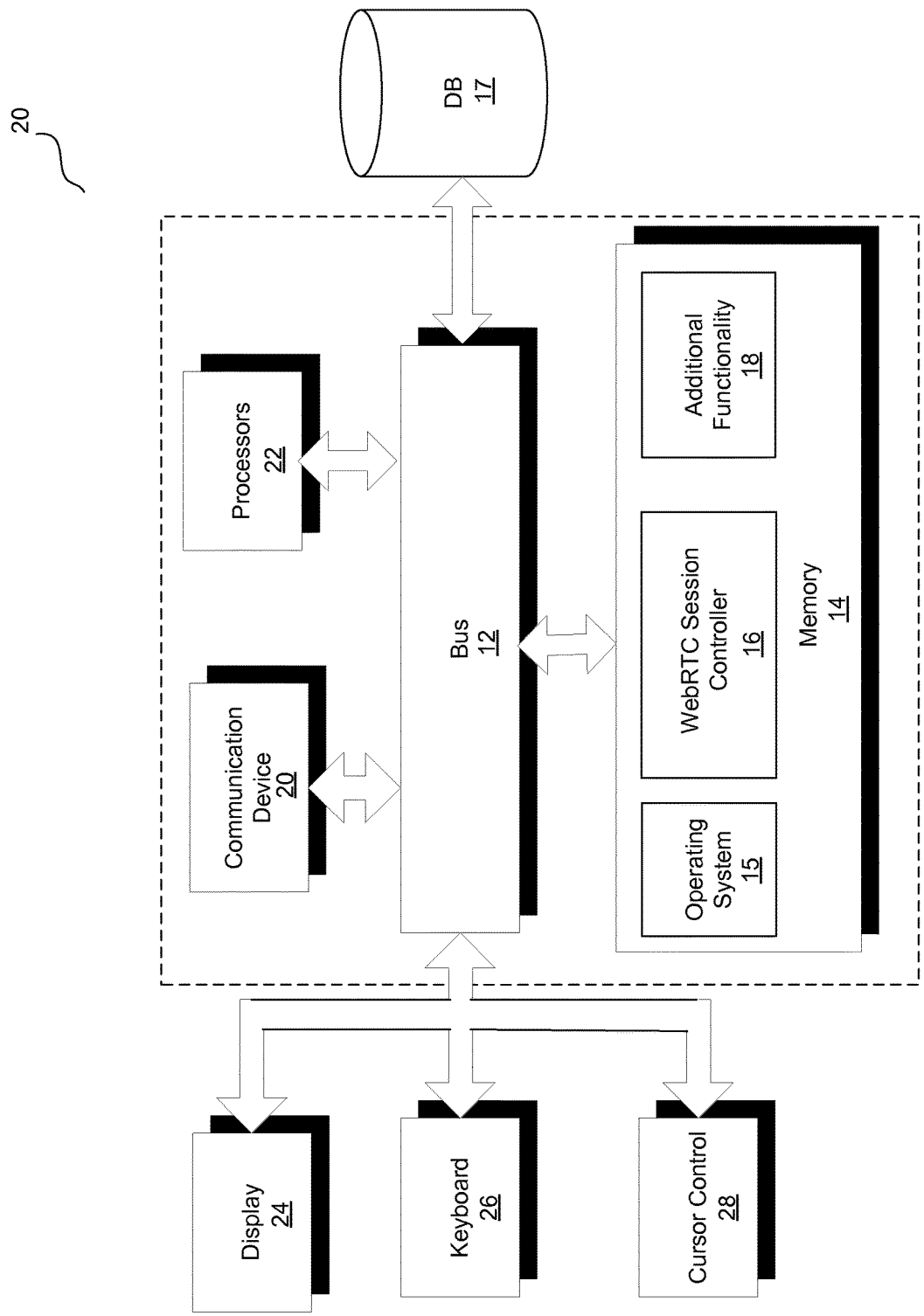
FIG. 2 is a block diagram of a computer server/system in accordance with embodiments of the present invention.

FIG. 2 is a block diagram of a computer server/system 10 in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a session controller, system 10 may be a server that in general has no need for a display 24 or one or more other components shown in FIG. 2.

System 10 includes a bus 12 or other communications mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communications device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communications media. Communications media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include WebRTC session controller module 16 for managing client wake up, and all other functionality disclosed herein. System 10 can be part of a larger system, such as added functionality to the "Oracle Communications WebRTC Session Controller" from Oracle Corp. Therefore, system 10 can include one or more additional functional modules 18 to include the additional functionality. A database 17 is coupled to bus 12 to provide centralized storage for modules 16 and 18.

Referring again to FIG. 1, with known systems, an endpoint communicating with SIP network 120 needs to keep a session alive with proxy servers in SIP network 120 (e.g., a SIP REGISTER session) so that other UEs (e.g., phones) can reach it (e.g., it can receive incoming calls from other endpoints/phones). A proxy server is a server (i.e., a computer system or an application) that acts as an intermediary for requests from clients seeking resources from other servers/endpoints. For WebRTC application 104, a session usually requires maintaining an open network connection (e.g., a WebSocket connection) with WSC 106. However, if WebRTC application 104 is running in a UE/device that is sensitive to resources (for example, a mobile phone with limited memory and battery life), keeping a WebSocket connection open requires the device to utilize resources such as battery, data connection, etc.

One known solution to provide better resource utilization is that instead of maintaining an ongoing continuous session, some SIP phones perform periodic registrations to keep a session alive. Another known solution is that some SIP phones have the flexibility to use User Datagram Protocol ("UDP") which does not require persistent connections. UDP is one of the core members of the IP suite. It uses a simple connectionless transmission model with a minimum of protocol mechanism. It has no handshaking dialogues. There is no guarantee of delivery, ordering, or duplicate protection.

One disadvantage with these known approaches is that they still require the devices to spend appreciable resources for periodic registration or for communicating based on UDP.

In contrast to the known solutions, embodiments of the present invention allow a WebRTC client to "sleep" by providing client wake up management. Accordingly, a device can preserve resources while keeping a session alive with corresponding servers so that incoming calls are not dropped.

In one embodiment, when initiating RTC, signaling engine 108 of WSC 106 establishes a WebSocket connection with WebRTC application 104 of UE 102 (which may be, for example, an Android or iOS device). A socket is a bidirectional communications endpoint for sending/receiving data to/from another socket. It is the fundamental technology for programming software to communicate on a transmission control protocol ("TCP")/IP network. A WebSocket is a protocol providing a full duplex communications channel over a single TCP connection.

In one embodiment, UE 102 may need to save resources (e.g., battery life) by closing the WebSocket connection with WSC 106. That is, UE 102 or WebRTC application 104 may enter a "sleeping" status. In one embodiment, "sleep" is implemented as a special JsonRTC message to WSC 106. This is performed using a special "close code" of the WebSocket protocol. Once the "sleep" message is received, WSC 106 preserves the data pertaining to the connection in a distributed storage, and starts a special timer thread to keep the connections with network entities (e.g., SIP servers such as proxies, registrar, Call Session Control Functions ("CSCFs"), etc.) open on behalf of the sleeping device. In some embodiments, a connection between WSC 106 and a network entity may be a network socket connection, or alternatively, may be a logical "network association" on existing network socket connections on behalf of the sleeping device (e.g., UE 102). Thereafter, if WSC 106 receives an incoming message targeted for UE 102 (or WebRTC application 104), UE 102 (or WebRTC application 104) needs to be "waken up." In one embodiment, upon receiving such incoming message, WSC 106 "wakes up" UE 102 (or WebRTC application 104) that had closed its connection to WSC 106 to save resources.

In one embodiment, the "wake up" functionality provided by WSC 106 integrates with push notification services from providers such as Google, Apple, etc. Apple Push Notification Service ("APNS") is a service created by Apple Inc. for forwarding notifications of third party applications to Apple devices. Such notifications may include, for example, badges, sounds, custom text alerts, etc. Similarly, Android push notifications is a service created by Google Inc. for letting an application notify a user of new messages or events. In one embodiment, in order to wake up UE 102 (or WebRTC application 104), WSC 106 sends a corresponding message to a push notification server 110, which in turn sends a wake up message to UE 102.

Figure 3:
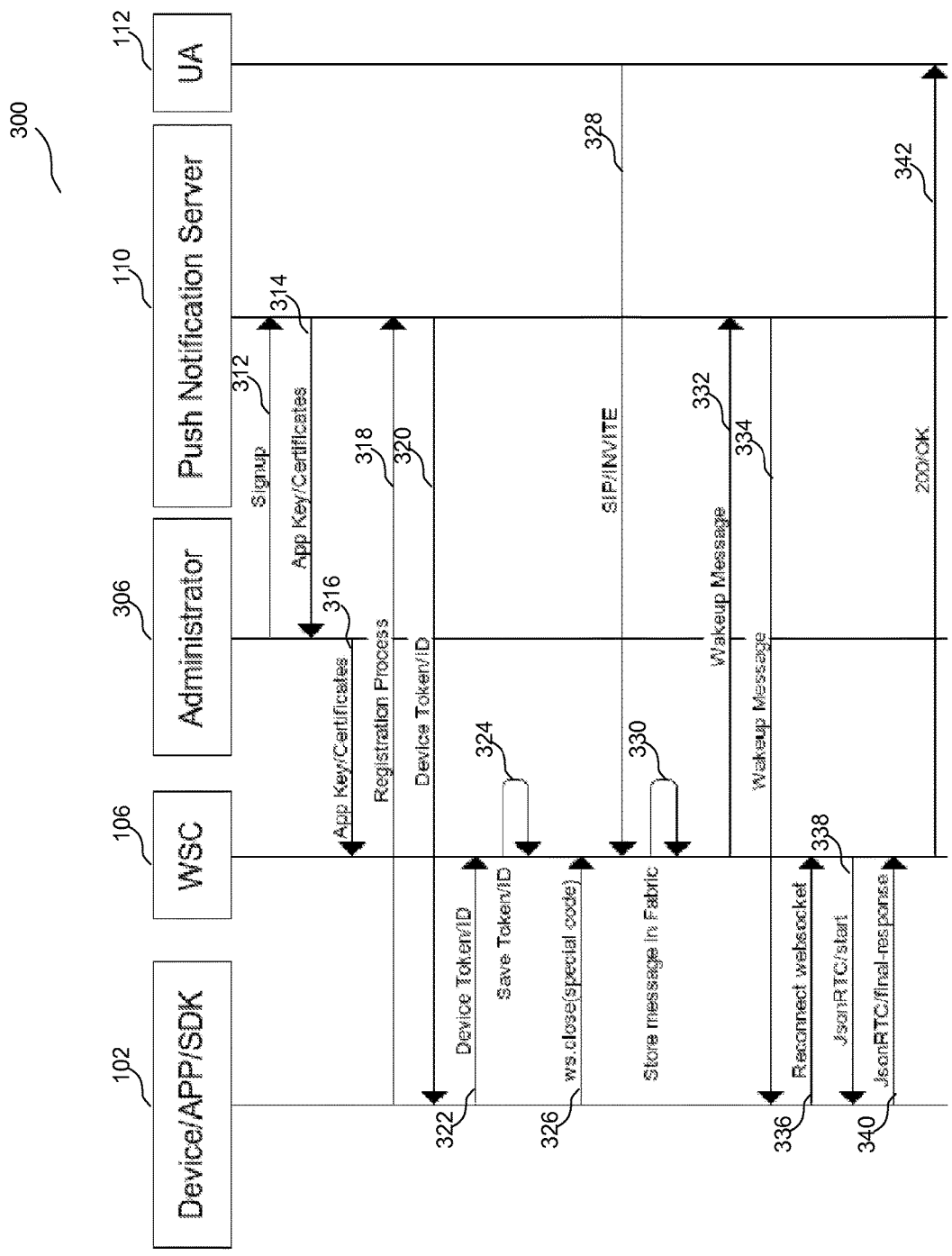
FIG. 3 is a call flow for client wake up in accordance with embodiments of the present invention.

FIG. 3 is an example call flow 300 for client wake up in accordance with embodiments of the present invention. In one embodiment, the functionality of call flow 300 of FIG. 3 (and/or the functionality of the flow diagram of FIG. 4 described below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

Network elements of FIG. 3 include UE 102 (e.g., a device including an application/SDK), WSC 106, push notification server 110, and UA 112. System 20 of FIG. 2 can be used to implement any of the network elements of FIG. 3. FIG. 3 further includes an administrator 306 that may configure WSC 106 and/or push notification server 110.

In call flow 300, at 312 administrator 306 creates a registration or account in push notification server 110. The account or registration may correspond to a client application executed in a device (e.g., UE 102). Push notification server 110 may be a server maintained by providers such as Apple, Google, Amazon, Nokia (i.e., Microsoft), etc. The registration process may differ for each provider. Upon registration, at 314 push notification server 110 provides administrator 306 with information required for sending messages to a corresponding push notification service. This information may, for example, include a key or identifier ("ID") for the client application at UE 102. Then, at 316 administrator 306 configures this information in WSC 106 so that a client wake up service at WSC 106 can later use it for sending wake up notifications corresponding to the application executed at UE 102.

At 318 the application running at UE 102 registers with push notification server 110, and at 320 the application obtains a device token/key from push notification server 110. The device token/key identifies the application and UE 102. At 322 the application sends the token to WSC 110 using the JsonRTC protocol, and at 324 WSC 106 saves this token. Once the token is saved by WSC 106, UE 102 may close its WebSocket connection with WSC 106 to save resources such as battery. In order to do so, at 326 UE 102 sends a code (e.g., a special "close" code) to WSC 106. This enables WSC 106 to know that UE 102 is planning to sleep for a potentially long period of time. WSC 106 then marks the corresponding JsonRTC session ID as "sleeping." It also preserves all the data pertaining to UE 102 in a secure distributed storage called fabric. This information includes information required by WSC 106 to maintain connection with SIP servers such as Proxy, Registrar, CSCF, etc. Fabric is a component that brokers message frames and/or other information across nodes in a cluster (i.e., multiple server instances running simultaneously and working together to provide increased scalability and reliability) and ensures that the correct node handles the message.

While the session is sleeping, if at 328 a message (e.g., an INVITE or another SIP message) that is targeted for UE 102 arrives at WSC 106 from UA 112, at 330 WSC 106 saves this message to fabric.

Instead of immediately forwarding the message to UE 102 that is sleeping, at 332 WSC 106 sends a formatted JSON message (i.e., formatted according to JSON notation supported by push notification server 110) with the JsonRTC session ID to push notification server 110. The formatted JSON message includes the registration key obtained at 316 and the device token obtained at 322. After receiving the formatted JSON message, at 334 push notification server 110 delivers a wake up message to UE 102. In one embodiment, push notification server 110 delivers the received formatted JSON message as the wake up message to UE 102.

Once UE 102 receives the wakeup message, at 336 the application reconnects the WebSocket connection with WSC 106. At this time WSC 106 can deliver the message received from UA 112 to the application at UE 102. In order to do so, at 338 WSC 106 sends a JsonRTC "start" message to the application, and at 340 the application sends a JsonRTC "final response" message back to WSC 106, indicating that the message has been delivered. Finally, at 342 WSC 106 sends a "200/OK" message to UA 112 indicating that its message has been delivered.

In one embodiment, the wake up procedure depends on device type (e.g., iOS, Android, etc.) and device state (e.g., display off, airplane mode on, etc.), and also on application type (e.g., web application, native application, etc.) and application state (e.g., foreground, background). For example, for iOS devices, if the WebRTC application is not running in the foreground, the wake up procedure uses a dialog to ask for permission of a user to start the application. If in an iOS device the WebRTC application is running in the foreground, the wake up message is delivered directly to the WebRTC application. Also, for Android devices, the WebRTC application decides how a wake up message is handled depending on whether the application is running in the foreground or in the background, and the Android "intent" structure may be used to provide this functionality. An intent provides functionality for performing late runtime binding between the code in different applications. In one embodiment, the wake up message payload is a JSON message which includes the JsonRTC session ID. In one embodiment, the wake up message payload includes the incoming message from UA 112 to WSC 106.

In one embodiment, in order to provide client wake up functionality, the signaling engine of WSC 106 integrates with different push notification providers and supports configuration for different push notification providers. Each push notification provider may have its own plugin that is integrated with WSC 106. Each plugin may support a mechanism to send push notification messages to a corresponding provider. Each plugin may also support the functionality to configure the push notification message format, as well as the configuration of keys and parameters that comprise the wake up message. For example, WSC 106 may support Android and iOS notification provider plugins. However, in some embodiments, a customer may write a custom plugin to a third party notification service provider. When an incoming message arrives from UA 112, WSC 106 invokes a plugin to send a message to push notification server 110. Further, WSC 106 may batch such messages to improve performance.

In one embodiment, a software development kit ("SDK") at UE 102 implements application programming interfaces ("APIs") for providing one or more of the following functionalities:

Initiating device and application registration with a corresponding push notification provider (may be alternatively implemented by the application);
Sending the device token/ID obtained from the push notification provider to WSC 106 (implemented by the SDK to support device wakeup);
Closing a session to indicate that it is sleeping (implemented by the SDK to support device wakeup); and Listening to wake up notification and restarting the Json-RTC session (may be alternatively implemented by the application).

Figure 4:
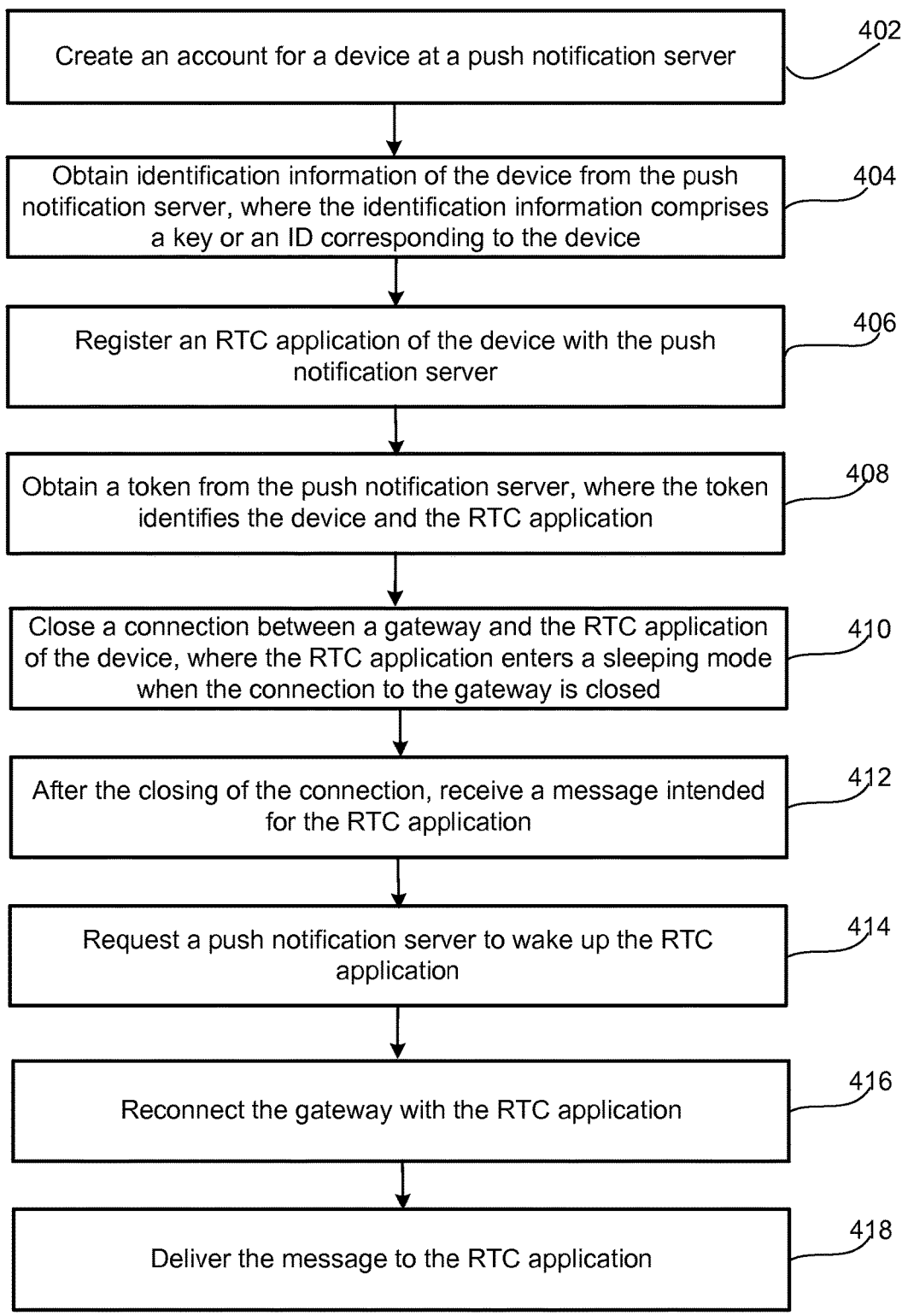
FIG. 4 is a flow diagram of the operation of the WebRTC session controller module of FIG. 2 when managing client wake up in accordance with embodiments of the present invention.

FIG. 4 is a flow diagram of the operation of WebRTC session controller module 16 of FIG. 2 (or WSC 106 of FIG. 1) when managing resources for a device that is running a WebRTC application, in accordance with embodiments of the present invention.

At 402 an administrator creates an account for the device at a push notification server, and at 404 the administrator obtains identification information of the device from the push notification server. The identification information may include a key or an ID corresponding to the device. The administrator provides the identification information to WSC 106 which stores it.

At 406 the WebRTC application is registered with the push notification server, and at 408 a token is obtained from the push notification server identifying the device and the WebRTC application. The WebRTC application provides the token to WSC 106 which stores it.

At 410 the WebRTC application closes its WebSocket connection with WSC 106 to enter a sleeping mode. The closing of the WebSocket connection between WSC 106 and the WebRTC application is performed upon receiving a corresponding message by WSC 106 from the WebRTC application indicating that the WebRTC application is entering the sleeping mode. Once the message is received, WSC 106 preserves/stores the data pertaining to the WebSocket connection in a distributed storage (e.g., fabric), and starts a special timer thread to keep the connections with SIP entities (e.g., proxies, registrar, CSCFs, etc.) open on behalf of the sleeping device.

After the WebSocket connection is closed, at 412 WSC 106 receives a message intended for the WebRTC application. The message that is intended for the WebRTC application may be received from a UA. Upon receiving the message, WSC 106 stores it at its fabric component.

At 414 WSC 106 requests that the push notification server wakes up the WebRTC application. In order to request the push notification server to wake up the WebRTC application, WSC 106 sends a JSON message to the push notification server. The JSON message includes a JsonRTC session ID of the WebRTC application, the identifying information, and the token. The push notification server forwards this message to the device for waking it up.

At 416 the WebSocket connection between WSC 106 and the WebRTC application is reconnected, and at 418 the message that was intended for the WebRTC application is delivered to it.

As disclosed, embodiments provide client wake up functionality so that a WebRTC application can "sleep" by closing a WebSocket connection with a gateway, while at the same time being able to receive incoming messages. In one embodiment, after the application closes its connection with the gateway, if the gateway receives an incoming message meant for the application, it requests that a push notification server wakes up the application. The gateway delivers the message to the application when the application wakes up and reconnects the WebSocket connection. Accordingly, a device that is sensitive to resources can receive incoming messages while at the same time being able to close a WebSocket connection to a gateway and save resources such as battery, data connection, etc. Closing such WebSocket connection also saves resources such as corresponding network ports.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to perform client wake up for real-time communications (RTC), the performing comprising:
    closing a connection between a gateway and an RTC application of a device, wherein the RTC application enters a sleeping mode when the connection to the gateway is closed;
    after the closing of the connection, receiving a message intended for the RTC application;
    requesting a push notification server to wake up the RTC application, comprising the gateway sending a JavaScript Object Notation (JSON) message to the push notification server, the JSON message including a JSON for RTC (JsonRTC) session ID of the RTC, identifying information, and a token;
    reconnecting the gateway with the RTC application; and
    delivering the message to the RTC application.

2. The non-transitory computer-readable medium of claim 1, wherein, prior to closing the connection, the performing further comprises:
    creating an account for the device at the push notification server; and
    obtaining identification information of the device from the push notification server, wherein the identification information comprises a key or an identifier (ID) corresponding to the device.

3. The non-transitory computer-readable medium of claim 2, wherein the performing further comprises:
    registering the RTC application with the push notification server; and
    obtaining the token from the push notification server, wherein the token identifies the device and the RTC application.

4. The non-transitory computer-readable medium of claim 3,
    wherein the RTC application provides the token to the gateway,
    wherein the gateway stores the identification information and the token.

5. The non-transitory computer-readable medium of claim 1,
    wherein the closing of the connection between the gateway and the RTC application is performed upon receiving a corresponding message by the gateway from the RTC application indicating that the RTC application is entering the sleeping mode,
    wherein, upon receiving the corresponding message, the gateway stores data pertaining to the connection in a distributed storage and starts a timer thread to keep connections with one or more network entities open on behalf of the RTC application.

6. The non-transitory computer-readable medium of claim 1,
    wherein the message that is intended for the RTC application is received from a user agent,
    wherein the gateway stores the message at a fabric component.

7. The non-transitory computer-readable medium of claim 1,
    wherein the RTC application is a WebRTC application, wherein the connection is a WebSocket connection,
wherein the gateway is a WebRTC session controller.

8. A method of client wake up for real-time communications (RTC), comprising:
closing a connection between a gateway and an RTC application of a device, wherein the RTC application enters a sleeping mode when the connection to the gateway is closed;
after the closing of the connection, receiving a message intended for the RTC application;
requesting a push notification server to wake up the RTC application, comprising the gateway sending a JavaScript Object Notation (JSON) message to the push notification server, the JSON message including a JSON for RTC (JsonRTC) session ID of the RTC, identifying information, and a token;
reconnecting the gateway with the RTC application; and
delivering the message to the RTC application.

9. The method of claim 8 further comprising:
prior to closing the connection,
creating an account for the device at the push notification server; and
obtaining identification information of the device from the push notification server, wherein the identification information comprises a key or an identifier (ID) corresponding to the device.

10. The method of claim 9 further comprising:
registering the RTC application with the push notification server; and
obtaining the token from the push notification server, wherein the token identifies the device and the RTC application.

11. The method of claim 10,
wherein the RTC application provides the token to the gateway,
wherein the gateway stores the identification information and the token.

12. The method of claim 8,
wherein the closing of the connection between the gateway and the RTC application is performed upon receiving a corresponding message by the gateway from the RTC application indicating that the RTC application is entering the sleeping mode,
wherein, upon receiving the corresponding message, the gateway stores data pertaining to the connection in a distributed storage and starts a timer thread to keep connections with one or more network entities open on behalf of the RTC application.

13. The method of claim 8,
wherein the message that is intended for the RTC application is received from a user agent,
wherein the gateway stores the message at a fabric component.

14. The method of claim 8,
wherein the RTC application is a WebRTC application,
wherein the connection is a WebSocket connection,
wherein the gateway is a WebRTC session controller.

15. A system for client wake up for real-time communications (RTC) comprising:
a closing module that closes a connection between a gateway and an RTC application of a device, wherein the RTC application enters a sleeping mode when the connection to the gateway is closed;
a receiving module that, after the closing of the connection, receives a message intended for the RTC application;
a requesting module that requests a push notification server to wake up the RTC application, wherein the gateway sends a JavaScript Object Notation (JSON) message to the push notification server, the JSON message including a JSON for RTC (JsonRTC) session ID of the RTC, identifying information, and a token;
a reconnecting module that reconnects the gateway with the RTC application; and
a delivering module that delivers the message to the RTC application.

16. The system of claim 15, further comprising:
a creating module that, prior to closing the connection,
creates an account for the device at the push notification server, and
obtains identification information of the device from the push notification server, wherein the identification information comprises a key or an identifier (ID) corresponding to the device.

17. The system of claim 16, further comprising:
a registering module that registers the RTC application with the push notification server; and
an obtaining module that obtains the token from the push notification server, wherein the token identifies the device and the RTC application.

18. The system of claim 17,
wherein the RTC application provides the token to the gateway,
wherein the gateway stores the identification information and the token.

* * * * *